United States Patent [19]
Valerino, Sr.

[11] Patent Number: 5,896,297
[45] Date of Patent: *Apr. 20, 1999

[54] ROBOTUBE DELIVERY SYSTEM

[76] Inventor: Fred M. Valerino, Sr., 327 Gailridge Rd., Timonium, Md. 21093

[*] Notice: This patent is subject to a terminal disclaimer.

[21] Appl. No.: 08/632,021

[22] Filed: Apr. 15, 1996

[51] Int. Cl.$^6$ .................................................. B65B 57/00
[52] U.S. Cl. ........................ 364/478.01; 364/478.03; 364/478.06; 364/478.18; 364/478.1
[58] Field of Search .................. 364/478.01, 424.027, 364/424.028, 424.029

[56] References Cited

U.S. PATENT DOCUMENTS

| | | | |
|---|---|---|---|
| 4,707,297 | 11/1987 | Paske, Jr. et al. | 252/301.16 |
| 4,889,241 | 12/1989 | Cogan et al. | 209/552 |
| 4,894,908 | 1/1990 | Haba Jr. et al. | 29/711 |
| 5,023,790 | 6/1991 | Luke, Jr. | 364/424.028 |
| 5,366,896 | 11/1994 | Margrey et al. | 436/48 |
| 5,370,215 | 12/1994 | Markin et al. | 198/346.1 |

*Primary Examiner*—James P. Trammell
*Assistant Examiner*—Demetra R. Smith
*Attorney, Agent, or Firm*—Ward & Olivo

[57] ABSTRACT

The invention relates to a four-step automated system for the transportation, through an automated guidance vehicle ("AGV"), of products such as pharmaceuticals to any location within a hospital. The system comprises an input queue, a dispensing apparatus comprising a robot device and a number of stations from which the robot device works, an inspection station, and an AGV transportation system. A computer interface provides bi-directional communication between analytical instruments, robots and peripheral devices. The robot and AGV employed by the system are responsive to computer commands and capable of performing mechanical functions including selection and retrieval of necessary item, and manipulation of retrieved items and delivery of said items, all without human intervention.

10 Claims, 5 Drawing Sheets

ROBOTUBE DELIVERY SYSTEM

The present invention relates to an automated system for the preparation and delivery of products, such as parenteral products from a hospital pharmacy, to any number of remote locations, for example a variety of predetermined stations within the hospital. The system comprises the four-step process disclosed in co-pending Application Ser. No. 08/513,569, i.e., a queue input step; a product preparation step; a product inspection step; and a transport step. More particularly, the present invention represents an enhancement of the previously disclosed system, wherein, preferably, an automated guidance vehicle (ROBOTOTUBE) is used in conjunction with robotic selection, reconstitution, and dispensing apparatus for preparing and transporting materials accurately and efficiently.

BACKGROUND OF THE INVENTION

Dramatic improvements in industrial productivity and quality have been achieved with the application of robotic technology. Spinoffs of this technology that will impact everyday life include home robots for housecleaning, lawn-mowing and fast food robots. Against this backdrop, hospitals and hospital laboratories across the country are beginning to consider the benefits of robotic automation. Health care traditionally has been a difficult marketplace for automation because of the complexity of the procedures and the potential health risks. Nevertheless, exciting medical applications such as the use of robots as assistants in surgical procedures have recently been described. Robots will have a significant impact on medical care by eliminating mundane chores, reducing the exposure of personnel to AIDS and other infectious diseases, and lowering labor costs.

In confronting increasing pressure to reduce the cost of providing analytical results, many laboratories have centralized their services to conserve resources. By consolidating services, expensive equipment has less idle time and labor is used more cost effectively. However, centralization may adversely affect the sample-to-result turnaround time by increasing the distance of the centralized laboratory from the origin of the specimen. Frequently, analytical results must be obtained in a short time to provide information for rapid assessment of a situation so that corrective actions may be taken. In medical care, for example, the clinical state of a critically ill patient must be assessed and corrected before a life threatening condition occurs. Similarly, in the outpatient clinic, providing results of blood analysis to physicians while the patients are still in the physicians' office is highly desirable because it obviates the need for a return appointment to discuss abnormal laboratory results. In industrial process control, real-time monitoring of the progress of chemical reactions by on-site analytical techniques prevents dangerous conditions or loss of products.

Until now, improvements in the turnaround of results have been obtained either by dedicated rapid specimen transportation systems or by simplifications of analytical techniques that make the specimen analysis faster. Pneumatic tube systems, mobile carts, and robotic messengers have been used with some success to transport specimens rapidly to the central laboratory, or from a central pharmacy to remote stations. The present invention provides a greatly improved delivery system, and is particularly directed to the use of AGV's in the transport step.

SUMMARY OF THE INVENTION

By definition, a robot is any machine that can be programmed to perform any task with human-like skill. Practically, the term robotics refers to programmable devices that can perform a variety of skilled actions by using a combination of mechanical and electronic components. Robots are often considered simply a mechanical extension of the computer. The greatest asset of a robot is that it can be configured to perform a multiplicity of tasks and therefore should wear out before it becomes outmoded. Devices designed for only one repetitive task are referred to as "hard automation," e.g., auto-samplers, pipetters, and all other instrumentation with limited mechanical capabilities or restricted programability.

Laboratory robots can take many forms, however, three basic configurations of robots are predominately used in the clinical laboratory environment, although many other robots are available that are suitable for the laboratory environment.

Cartesian robots are devices with three linear degrees of freedom. Items can be moved about in a three-dimensional (x,y,z) space, but not rotated. Cartesian robots are the basis for sampling devices in many automated analyzers. However, Cartesian robots have found more versatility in the clinical laboratory as pipetting stations, designed to perform many liquid-handling activities.

An example of a Cartesian robot would be the Biomek pipetting station (Beckman Instruments, Brea, Calif.) where the robot can be programmed to perform various liquid-handling protocols. Cartesian robot-pipetting stations allow placement of a pipette tip at any point in space, within approximately equal to 0.2 mm repeatability, with the capability of aliquoting and diluting specimens and dispensing reagents. Cartesian robot-pipetting stations have as their principal components microprocessor-controlled stepping motors that drive liquid-handling syringes, pipetting arms, and in some units movable sample trays.

The Biomek is a hybrid robot in that it has a series of interchangeable hands that allow it to vary its pipetting capabilities. However, the Biomek cannot mechanically manipulate test tubes. In addition, it comes equipped with a built-in spectrophotometer. The Biomek and other similar pipetting stations can be programmed to perform other useful liquid-handling chores such as washing an antibody-coated bead, or rinsing the wells in a microtiter plate.

Recently the Biomek has been configured to perform a monoclonal solid-phase immunoenzymatic assay for carcinoembryonic antigen (Hybritech Inc., San Diego, Calif.). Because of the Biomek's built-in spectrophotometer, the entire assay, including bead washing and data reduction, is handled automatically.

There are several examples in the clinical laboratory of the use of pipetting stations to perform analytical procedures. Brennan et al demonstrated the use of the Tecan Sampler 505 (Tecan AG, Hombrechtikon, Switzerland) in the screening test for anti. HTLV-III antibodies. The procedure required placing a patient's plasma sample in a rack, after which the pipetting station diluted the plasma 441-fold. A barcode reader and pipette washer were retrofitted to the device to positively identify patients and to eliminate carry-over, respectively. The system operated at approximately the same rate as a trained medical technologist but demonstrated better precision and allowed technologists to perform other tasks.

The cylindrical robot, exemplified by the Zymate robot (Zymark Corp., Boston, Mass.) works in a cylindrical performance envelope. The four degrees of freedom exhibited by cylindrical robots (base rotation, elevation, movement in and out of a plane, and wrist roll) are usually sufficient for most laboratory operations. The major limitation of these robots is the lack of wrist pitch, which would be useful for getting in and out of tight places. Additional flexibility in task performance is obtained by programming the robot to use a series of interchangeable hands (a feature patented by Zymark Inc.). Hand and finger orientation is determined by potentiometric servo motors that allow the robot to "sense" its orientation at all times. This arm is a popular choice for simple repetitive tasks and has been used successfully for many sample-preparation protocols, both in the clinical laboratory and in the pharmaceutical industry.

The use of a cylindrical robotic arm to produce an automated blood-typing system that would be affordable to most laboratories has been investigated. The system consists of an indexing rack for samples, which are identified by a barcode reader. After significant development over several years, the system was described again, with throughput increased from 40 to 104 samples per hour. The device was later commercialized by Microban (Dynatech Laboratories, Chantilly, Va.). The success of robotic applications in the blood bank is due to the production line nature of blood typing. Laboratory services that support blood banks require many repetitive analyses before the blood can be used for transfusion. It has been estimated that, in 1984, 12 million units of whole blood were collected in various medical centers, each unit of which required ABO and Rh typing. The blood-typing process has been automated by some manufacturers, but these units cost greater than $ 100 000 and so are not accessible to most regional hospitals with small transfusion volumes. Robotic arms not only are less expensive than a dedicated blood-typing instrument but also can be reprogramed when the laboratory's needs change.

The cylindrical robot has been used in the clinical chemistry laboratory at the Cleveland Clinic Foundation to prepare samples for an HPLC method in a complex series of steps: sample extraction, separation of liquid phases, and injection. These investigators incorporated several Zymate robotic systems into a laboratory for the analysis of antidepressants. Medical technologists were needed to prepare the reagents, to place necessary supplies at the designated locations within reach of the robot, and to evaluate the quality of the final results. The robotic laboratory was placed under a fume hood to eliminate any toxic fumes originating from extracted samples during the evaporation process. The robot completed the drug extractions and made the sample injection into the chromatograph by using a specially designed injection hand. For several years these robots have been performing their repetitive tasks with only minor malfunctions.

The use of a robot to perform preparative immunologic precipitations, with final placement of the samples into a rotor for subsequent analysis has been recently reported. This robotic system, which consisted of a Zymate robot and a Cobas-Bio rotor (Roche Diagnostics, Nutley, N.J.), was the first reported system to combine a clinical analyzer and a laboratory robot. However, placing the rotor in the analyzer and transferring the data to the laboratory computer were performed manually.

The Vancouver General Hospital has automated a highly complex steroid-receptor analysis, using a Zymate robotic system. The estrogen receptor assay ordinarily is a manual procedure, involving many critical steps such as centrifugation, incubation, and subsequent placement of completed samples in scintillation vials. In the automated procedure, the incubation water bath, centrifuge, and supply and reagent stations are placed in a circular pattern around the robotic arm. The reagents, which are particularly labile in this assay, are kept cold in an ice bath. Finished samples are added to scintillation vials by the robotic arm. Because more than one rack of vials is produced in a single uninterrupted robotic procedure, the scintillation vial racks are placed in a tiered holder to allow the robot access to two racks.

A Zymate robot, fitted with exchangeable pipetter hands, has been used to dilute and transfer samples for blood grouping in the blood bank. The robot, configured as a pipetting device, was also used to orient samples for barcode reading. After the robot had performed the liquid handling, a human operator proceeded with additional manual aspects of the test. As discussed earlier, many blood-bank analytical methods are relatively simple and are used in sufficient numbers to warrant a dedicated analyzer.

The most versatile robot available to the clinical laboratory is the articulating robot in that it offers more degrees of freedom than either the cartesian or the cylindrical robots. The articulating robot has shoulder, elbow, and wrist joints, rotating on a pivoting base. Furthermore, the robot has wrist pitch-and-roll, as well as wrist yaw maneuvers, that allow access to areas often difficult to reach on analytical instruments. Positional accuracy of 0.5 mm or better is obtained by using optically encoded discs that must be set by nesting to a home or zero location each time the robot is turned on. A recent example of a sophisticated articulating robot is from Cyberfluor Inc. (Toronto, Ontario, Canada). The Cyberfluor robot has a high degree of flexibility, with five degrees of freedom. Sample processing is currently the rate-limiting step in most clinical laboratories. Using a robot in conjunction with a clinical centrifuge allows processing of samples as they enter the laboratory. One advantage of an articulating robotic arm is its ability to reach over the rim and into a clinical centrifuge to retrieve samples. For a cylindrical robot to perform this task requires use of a custom-altered centrifuge or a custom-made robotic hand. A novel serial centrifuge has also been developed to separate sera or plasma from formed elements in the blood-collection tube. The single-tube centrifuge will eventually be incorporated into a robotic sample-handling system that should not only speed up laboratory productivity but also reduce risk of exposure to AIDS and hepatitis.

Articulating robots are also beginning to be used in the blood-bank laboratory. One manufacturer of blood-banking automation (Flow Laboratories, McLean, Va.) markets a robot interfaced to various microplate-handling devices (pipetters readers, washers, centrifuges). The entire device (the IROBAL) is enclosed in a protective hood, obviously designed to reduce operator exposure to contaminants.

Establishing control of robot motion to mimic the smooth movement of the human arm with a high degree of repositional precision is a difficult problem addressed by the science of kinematics. Kinematics are applied to the robot in three levels of complexity. First, trajectory planning determines position, velocity, and acceleration for each movement made by the robotic manipulators. Second, inverse kinematics are applied to translate the movements required in the coordinate system into the joint movements required by the particular geometry of the robot being developed. Finally, inverse dynamic equations are applied to establish how the robot moves in response to various applied torques and forces. Each movement of the robot is represented, therefore, by a set of remarkably complex equations, the implementation of which has fortunately been simplified through the use of high-level computer languages.

With respect to the transport step. Robot locomotion is a general term applied to all types of robot movement in which the robot can venture away from a fixed point. Locomotion imparts another degree of freedom to the robot but also allows an increase in the variety of hardware with which a robot can interact. Robots can be made mobile by several methods. Robotic arms can be attached to linear tracks or to a mobile cart. In the case of a mobile cart, the portion of the robot imparts mobility is considered an "Automated Guided Vehicle" (AGV). AGVs are either equipped with an automatic onboard guidance system or follow a path on the floor wall or ceiling. Guidance is provided through various sensors, e.g., infrared, video, magnetic, or simple light sensors for reflective tape paths. Equipping AGVs with a robotic component produces a mobile robot. Some robots are being designed to have human-or animal-like gait, so that they may climb stairs, for example. The study of bringing human-or animal-like gait to robotic machines is called bionics.

A recent improvement in robot locomotion is the use of linear tracks. The robotic arms can travel the length of a linear track, either upright or upside down, with positional precision of 0.5 mm. This concept has altered the evolution of laboratory design from circular tables with the fixed robot in the middle, back to the classic laboratory bench stretched along the perimeter of the room. Ergonometric laboratories are now possible, such that either technologists or robots can operate the instruments. Robots that can travel the length of a laboratory bench have performance envelopes (the areas in which the robot can perform useful work) that resemble an elongated hemisphere of a doughnut.

Several attempts at robot locomotion have been tried in the clinical setting. Computer-driven vehicles that move about the hospital corridors picking up specimens and delivering them to the main laboratory have been popularized. Similarly, robotic vehicles that move about the laboratory, returning empty specimen racks to the central specimen-receiving area of the lab have also been designed. Mobile robots that can negotiate the corridors of a hospital for specimen delivery have been investigated by Transitions Research Corp. (TRC, Danbury, Conn.) and Saurer Automation Systems, Inc. (Holland, Mich.). Unlike many mobile robots, the TRC Helpmate does not rely on a guide affixed to the floor. The TRC mobile robot is equipped with infrared, ultrasonic, and vision sensors to acquire information about the environment. With the aid of a preprogrammed knowledge base of the hospital layout, the robot arrives at its destination without colliding with patients or objects in its path. Saurer's AGV follows a fluorescent dye guidepath which may be placed directly onto carpeting.

The mechanical performance of the robot can be enhanced by adding sensor technology on the hands or joints of the robot. Various mechanical and electronic sensor systems may be used, e.g., computerized imaging systems to check for sample integrity and container position for access by a robot. Currently, video systems allow a robot the greatest degree of spatial resolution. Several investigators are looking at the feasibility of tactile sensing in the fingertips of robotic fingers. Tactile sensing approaching that of the human finger is in the foreseeable future.

The advantage of sensor technology is the ability of the robot to respond to changes in the analytical method. With proper sensor technology, closed-loop operation of robots becomes a possibility. Analytical data can be checked by the robot's host computer, which is equipped with an expert system, and corrective measures such as sample re-analysis can be initiated if necessary. Many of these enhancements to increase the intelligence of the robotic system have not been examined in the clinical laboratory setting. However, both the Zymate and Cyberfluor robots have fingers that can sense the presence of absence of objects in their grasp. This feature is helpful if test tubes or syringes are dropped inadvertently during a procedure.

Perhaps the single most important factor that has stimulated the introduction or robotics into the clinical laboratory has been the development of high-level robot programming languages with English language commands. For example, the simple command GOTO MIXER initiates an intricate sequence of steps to drive the robotic arm to the mixing device. Several interfaces away from the user's command, the software generates electronic signals to the robot's motion-control mechanism to coordinate a smooth movement arc that terminates at a precise location near the mixer. Complex algorithms involving robot kinematics translate computer machine-code into signals that control the acceleration after commencing the movement and the deceleration before the robotic arm stops at the mixer. Furthermore, to avoid spilling any liquid, the robotic fingers are held parallel to the work surface throughout the complex series of movements. Elaborate procedures can be developed by combining a series of simple commands, which are programmed and tested individually. The robot can be instructed to pause in a procedure, examine the status of a sensor or instrument, and then proceed through a choice of subsequent programs, depending on the outcome of the test. Programmed intelligence of this sort allows highly adaptive systems for performing many assays.

The integration of the various levels of programing language and the input and output ports of the robotic system are controlled by a high-level robot language. Future robotics software is being directed toward standardization and modularization of the basic operations performed in the clinical laboratory: sample manipulation, liquid handling, separation, conditioning, weighing, measuring, reporting, and storing by use of a modular approach. High-level robotic control languages will reduce the time necessary for assay automation. Intellibotics (Oxnard, Calif.) has used a computer graphics interface to simplify writing robot programs. The programs can be implemented graphically before being used to actually run the robot. Modular programming will allow rapid integration of several basic operation modules into a complete assay procedure with appropriate instrumental status checks. Standardization of interfaces with peripheral hardware (i.e., centrifuge, mixer, and pipetter) will be essential for the rapid incorporation of various sample manipulations in the development of robotically controlled assays.

The term user interface implies a software design that makes many of the complex codes for robotic motion control and data input/output transparent to the user. One should be able to use simple English language commands to train a robot to perform any task within its mechanical performance envelope. Perkin-Elmer Corp., Zymark, and Cyberfluor, Inc. have developed simple-to-use robotic-control languages accessible to most computer programmers. Unfortunately, no robot vendor has simplified all aspects of robotics software. In particular the programing associated with communication with other devices remains incomplete.

The use of digitized images (e.g., a picture of the robot and peripheral equipment on the touch screen computer monitor) should allow the user to point to destinations in the picture to which the robot will then physically move. Graphic image inter-faces should reduce the time needed to train laboratory technologists to implement new procedures. Training a laboratory robot to move to specific coordinates on the robotic work-surface can be effected through either a teaching pendant (a group of switches on a remote control) or directly through the robotic keyboard. The robot is positioned by the trainer to a certain location and then the coordinate is entered into the computer via a switch or press of a key on the keyboard. A second coordinate may then be entered in a similar manner. Using simple commands from the keyboard, one replays the coordinates and the robot will move as instructed. Because robots are inherently blind and without tactile senses, they will collide with any obstacles in the path between the two points. Thus trainers must include a third point in the robot program that will allow a collision-free trajectory. A recent innovation in robotic training is the "limp mode" used by the CRS robot marketed by Cyberfluor. In this mode a robot trainer can simply grasp the robot arm and move it to a location. A press of a button automatically enters the position into the robot software, where it will be repeated once the software routine is started. Some future prospects for robot training may couple hand movements with digitized images of the work surface. The monitor will display a picture of the robotic laboratory from a choice of perspectives (e.g., top or side view). A trainer then moves his or her hands on the computer monitor in the path the robot will take during the execution of a procedure. Imaginative methods to train robots will simplify and accelerate the programming of new procedures. Efficient robotic laboratories use procedures that are reduced to LUOs (laboratory unit operations); these are used repeatedly or recombined in a different order as laboratory procedures change. Creating new procedures is simplified by the modular design of the robotic laboratory. The most basic LUOs encompass the moving of items around the laboratory bench, or manipulation. A subcategory of this LUO is robotic interaction with a matrix. Many designers of robotic software have simplified the steps necessary to define and interact with a matrix, such as a test-tube rack, because retrieving samples is universal to almost all procedures. To be successful, implementation of laboratory robotics requires careful planning, attention to detail, and specialized training of staff and skilled support personnel.

The present invention is particularly directed to the use of AGVs in the transportation of materials. A variety of automated guidance vehicles (AGV) have been developed, with a principal use of performing delivery or work functions in an office, hospital or industrial facility. The basic types of guidance systems used on these unmanned industrial vehicles have been permanent tracks, buried wire, reflected light, and radio controlled.

Track-guided vehicles ride along a fixed rail or a track and are guided by the contour of the track. This technique is often unacceptable, especially in office situations, since the presence of a fixed or permanent track on many floor surfaces is aesthetically, as well as physically, undesirable. The installation of such a permanent track is expensive; and it is difficult and expensive to change the location of the track, thereby greatly reducing the flexibility of the system.

Buried wire guidance systems have been applied successfully to various material handling systems, including hospital food tray delivering vehicles and office mail carts. In this system, a wire is buried in the floor along the track the vehicle is to follow and both ends of the wire are terminated at an excitation source.

In reflected light sensing systems, a brightly visible line, contrasting markedly with the surface of the floor, is laid along the path to be followed by the AGV. In this type of guidance system, there is no variation in the frequency of the incident and reflected light. The vehicle includes a visible light source that illuminates the floor and photocell sensors that detect the level of light reflected from the floor. Both the background and guideline illumination are detected to determine guideline position. A positive attribute of a reflected light system is that an existing line can be removed and a new guidepath applied.

To overcome some of the disadvantages inherent in these types of AGV systems, automated guidance vehicles were developed that followed invisible fluorescent guidepaths. The guidance system of these AGVs works on the principle of applying a fluorescent dye-containing guidepath. As the AGV traverses the guidepath, a source of ultraviolet light on the AGV illuminates the guidepath causing the fluorescent dye to emit visible radiation, which is detected by photocell sensors on the AGV, and, through the correct circuitry, the AGV is steered along the guidepath. Generally, the photocell sensors sense the emitted visible radiation and produce an error output signal proportional to the variation of the vehicle's position from a predetermined lateral position with respect to the guideline. A steering mechanism then reacts in response to the error signal so as to correct the vehicle's position and to keep it on the guideline.

In addition, the guidepath is necessarily designed to be detected by the AGV in a reliable fashion with a minimum of interference by other floor surface factors. For use with the present stimulated emission AGVs on the market, the guidepath must fluoresce in the visible range when stimulated by ultraviolet radiation. The guidepath must overcome potential interferences with changes in surface color due to bold patterns or transitions from one surface or surface area to another.

Numerous compositions have been used to apply a fluorescent guidepath. These compositions fall into two broad categories, solvent-borne solutions and water-borne emulsions.

The solvent-borne guidepath compositions generally contain flammable solvents, requiring precautions to be taken during production, storage, shipping, and application. The solvent vapors liberated during application to a floor can have an objectionable odor, requiring work to be performed after normal working hours. In addition, the solvents are usually toxic by inhalation, requiring full building ventilation and respirators to protect the workers during application.

The solvent solution formulations provide good visual aesthetics, acceptable traffic and maintenance resistance, and easy deactivation when applied to hard or resilient surfaces, such as composition tiles, marble, concrete, and ceramic tile. In addition, certain solvent formulations can be successfully used on most carpeted surfaces.

The water-borne emulsion guidepath compositions generally contain polymers which cure at room temperature upon mixing with a cross-linking agent. Mixing must occur immediately prior to application. The amount of cross-linking agent is critical to the performance of these coatings, requiring an involved packaging procedure. In addition, mixing reduces the useful life of the product from up to 12 months to only 24 hours, resulting in wasted product during field application.

The water-borne emulsion compositions provide acceptable visual aesthetics, outstanding traffic and maintenance resistance on hard or resilient surfaces, such as composition tiles, concrete, marble, and ceramic tile and can be removed with some difficulty using suitable solvents. On most carpeted surfaces, however, they produce visible guidepaths which cannot be removed. Thus, their practical utility is limited to hard or resilient surface guidepaths.

Suitable guidepath compositions have been disclosed in a number of patents, including U.S. Pat. No. 5,277,839 and U.S. Pat. No. 4,707,297.

In many hospitals large numbers of doses of parenteral products have to be prepared daily, for example intravenous bags and other medications administered intravenously. These doses are usually prepared manually in what is an exacting but tedious responsibility for a highly skilled staff. It is, therefore, an object of this invention to provide an automated dispenser to simplify the manual operations necessary for preparing doses of parenteral products while maintaining the exacting standards set by medical regulatory bodies.

Further, prompt and reliable delivery of parenteral products to the patient is essential to the daily operations of a hospital. Manual delivery can be slow and unreliable, possibly resulting in harm to patients. Pneumatic tube transportation systems are currently used to transfer blood samples, medicines, intravenous bags, viral samples or other biological or chemical matter between locations within a hospital or laboratory quickly and reliably. Thus, it is an object of this invention to combine the pneumatic tube system with a robot device apparatus to provide a complete automated system for the efficient processing and delivery of parenteral products within a hospital. Other uses of the present invention include dietary, laboratory, and central supply systems, as well as to prepare and deliver intravenous bags.

BRIEF DESCRIPTION OF THE DRAWINGS

The invention will be better understood with reference to the drawings, in which.

DETAILED DESCRIPTION OF THE PREFERRED EMBODIMENT

Preferably, the system of the present invention utilizes a fluorescent dye-sensing AGV. Presently available stimulated-emission AGVs are equipped with an ultraviolet radiation source and detectors capable of following a guidepath having any emissive pigment that emits radiation at wavelengths greater than 400 nm. Wavelengths above 400 nm to about 2500 nm correspond to emission radiation in the visible through the near infrared range. Present day AGVs are equipped with ultraviolet light excitation sources and visible through near infrared light detection sensors as the basis of their guidance systems. This eliminates some AGV guidance problems relating to spurious background emissions and false guidepaths.

Early versions of the guidepath used on a carpet were made from a fluorescent dye such as benzothiazole derivatives which were dissolved in a non-acidic toluene/methanol solution. This solution worked for light colored carpets such as tan or grey. However, the dye was removed by strong carpet cleaning detergents, and was destroyed by exposure to ultraviolet rays in sunlight.

A second type of carpet guidepath was developed which used toluene as a primary solvent, and again a non-acidic luminescent dye compound such as a benzothiazole derivative, which was not destroyed by sunlight. An acrylic polymer was incorporated into the guidepath formula to bind the dye to the carpet fibers. This guidepath wore away over a few months on most carpets and after repeated applications the material left an unsightly dark line on the surface of the carpet.

A third type of carpet guidepath material was disclosed in U.S. Pat. No. 4,707,297. The neutral to basic material included a fluorescent dye or pigment dispersed in water combined with an acrylic resin crosslinked with zinc or zirconium ions. The guidepath was not visible on carpet and was removable with solutions like ammonia in water. A carpet guidepath made by this method wears away over a three to six month period. This guidepath will also be removed by cleaning with alkaline carpet shampoos.

Alternative systems have been utilized wherein magnetic tapes are being installed beneath the carpet. These systems require no maintenance for the guidepath, however they must be installed before the carpet is put down.

Various other neutral to basic water soluble dyes such as benzothiazole derivatives like sodium 3-(2-benzothiazolyl)-4-hydroxybenzene-sulfonate have been produced and used for guidepaths. The fluorescent emission of these dyes was shifted from green to blue when exposed to these alkaline cleaning materials commonly used in carpet maintenance. The material was also susceptible to discoloration and loss of brightness when exposed to ultraviolet light. Further, the guidepath material's fluorescent emission was not bright enough to be tracked reliably on dark colored carpets.

The present invention preferably utilizes a guidepath solution of sulfonated luminescent dyes which when applied to carpet in an acid state form a permanent bond between the carpet fiber and the dye. When used in an aqueous solution, the guidepath solution has an adjusted pH below 4.0 and preferably below 2.0. When used in a non-aqueous solution, the acidic dye compound has sulfone groups which are protonated. These compounds luminesce more efficiently, are not affected by conventional alkaline cleaning materials and are not discolored by exposure to ultraviolet radiation. A particularly preferred guidepath dispersion or solution phase includes an aqueous solution or dispersion of a sulfonated luminescent dye compound; a solvent such as water, ethanol, methanol, propanol and/or isopropanol; a pH adjustor; and a surface active agent to improve penetration such as Triton Gr-5M from Union Carbide (wetting agent). The sulfonated luminescent dye is capable of absorbing ultraviolet light and emitting radiation which can be detected by the photocell sensors on the AGV. The emissions can be detected at preferred wavelengths thereby allowing separation from background emissions.

A suitable luminescent dye which serves the basis of the guidepath composition is 2-(5-benzamido-3-benzoyl-2-hydroxyphenyl) benzoxazole. To produce this desired compound, 2-(5-amino-2-hydroxyphenyl) benzoxazole is dissolved in pyridine. The benzoxazole compound can be produced in a variety of ways (see U.S. Pat. No. 3,162,642). Benzoyl chloride is added in a ratio of 2 molar equivalents of the benzoyl chloride to one molar equivalent of the benzoxazole, over several minutes, and kept at a temperature equal to 200°–250° C. The mixture is concurrently stirred during which the product precipitates out of solution resulting in a slurry. The slurry is then mixed with water and filtered. The filter cake is washed with distilled water and methanol. The product is then dried at 100° C. for 16 hours. The resultant product [2-(5-benzamido-3-benzoyl-2- hydroxyphenyl) benzoxazole] is white in color and luminesces with a bright yellow-green emission.

The prepared dye is then sulfonated. The dye material, produced above, was added over a short, 15 minute, period to fuming sulfuric acid. The mixture is initially cooled with an ice bath. After 16 hours, the mixture is poured over ice. A light yellow precipitate is formed and is separated from the water by vacuum filtration. The filter cake is washed with ice water. The material is then dried at 100° C. for 16 hours to form the sulfonated 2-(5-benzamido-3-benzoyl-2-hydroxyphenyl) benzoxazole (see U.S. Pat. No. 3,491,106).

Other suitable classes of fluorescent compounds useful alone or in admixture in the guidepath compositions include the quinazolones, the oxazoles, the benzimidazoles, or the hydrazines; or classes of compounds represented by such compounds as the 1,8-dihydroxyanthraquinones, 4,5-diphenylimidazolones, p-methoxyphenylhydrazones, 6-hydroxynicotinic acids, salicylaldehyde semi-carbazones, 2-aminobiphenyls, 2-phenylbenzoxazoles, the class of bis (8-hydroxyquinolino)ZnII compounds, N,N"-bis-(salicylideneamino)oxamidenes, or the 1-cyanoformimidic acids. The following specific examples of fluorescent and phosphorescent compounds is indicative of the dyes and pigments which are expected to function suitably when used as the guidepath compositions, and is given by way of illustration and not by way of limitation.

2-(2-(napthylenesulfonylamino)phenyl)-4H-3,1-benzoxazin-4-one;

2-(1-(napthylenesulfonylamino)phenyl)-4H-3,1-benzoxazin-4-one;

2-(2-(p-toluenesulfonylamino)phenyl)-4H-3,1-benzoxazin-4-one;

2-(2-(o-toluenesulfonylamino)phenyl)-4H-3,1-benzoxazin-4-one;

2-(2-(2,4,6-trimethylbenzenesulfonylamino)phenyl)-4H-3,1-benzoxazin-4-one;

2-(2-(4-isopropylbenzenesulfonylamino)phenyl)-4H-3,1-benzoxazin-4-one;

2-(2-aminophenyl)-4H-3,1-benzoxazin-4-one;

2-(2-methylaminophenyl)-4H-3,1-benzoxazin-4-one;

2-(2-tosylaminophenyl)-4H-3,1-benzoxazin-4-one;

2-(2-(N-methyl-N-tosylamino)phenyl)-4H-3,1-benzoxazin-4-one;

2-(2-acetaminophenyl)-4H-3,1-benzoxazin-4-one;

2-(2-benzoylaminophenyl)-4H-3,1-benzoxazin-4-one;

2-(2-benzenesulfonylaminophenyl)-4H-3,1-benzoxazin-4-one;

2-(2-(p-nitrobenzoylaminophenyl)-4H-3,1-benzoxazin-4-one;

2-(2-(p-nitrobenzenesulfonylaminophenyl)-4H-3,1-benzoxazin-4-one;

2-(2'-hydroxyphenyl)-benzimidazole;

2-(2'-hydroxyphenyl)-benzoxazole;

2-(2'-hydroxyphenyl)-benzothiazole;

2-(2'-hydroxy-5'-aminophenyl)-benzothiazole;

2-(2'-hydroxy-3'-bromophenyl)-benzothiazole;

2-(2'-hydroxy-4'-bromophenyl)-benzothiazole;

2-(2'-hydroxy-5'-bromophenyl)-benzothiazole;

2-(2'-hydroxy-3',5'-dibromophenyl)-benzothiazole;

2-(2'-hydroxy-3'-chlorophenyl)-benzothiazole;

2-(2'-hydroxy-4'-chlorophenyl)-benzothiazole;

2-(2'-hydroxy-5'-chlorophenyl)-benzothiazole;

2-(2'-hydroxy-3',5'-dichlorophenyl)-benzothiazole;

2-(2',3'-dihydroxyphenyl)-benzothiazole;

2-(2',4'-dihydroxyphenyl)-benzothiazole;

2-(2',5'-dihydroxyphenyl)-benzothiazole;

2-(2',6'-dihydroxyphenyl)-benzothiazole;

2-(2'-hydroxy-3',5'-diiodophenyl)-benzothiazole;

2-(2'-hydroxy-3'-methoxyphenyl)-benzothiazole;

2-(2'-hydroxy-4'-methoxyphenyl)-benzothiazole;

2-(2'-hydroxy-5'-methoxyphenyl)-benzothiazole;

2-(2'-hydroxy-3'-methylphenyl)-benzothiazole;

2-(2'-hydroxy-4'-methylphenyl)-benzothiazole;

2-(2'-hydroxy-5'-methylphenyl)-benzothiazole;

2-(2'-hydroxy-3',5'-dimethylphenyl)-benzothiazole;

2-(2'-hydroxy-3'-nitrophenyl)-benzothiazole;

2-(2'-hydroxy-5'-nitrophenyl)-benzothiazole;

2-(2'-hydroxy-3',5'-dinitrophenyl)-benzothiazole;

2-(2'-hydroxy-5'-fluorophenyl)-benzothiazole;

2-(2'-hydroxy-4'-(dimethylamino)phenyl)-benzothiazole;

2-(2'-hydroxy-4'-(diethylamino)phenyl)-benzothiazole;

2-(2'-hydroxy-5'-acetamidophenyl)-benzothiazole;

2-(2'-hydroxy-5'-benzamidophenyl)-benzothiazole;

2-(2'-hydroxy-5'-benzylideneaminophenyl)-benzothiazole;

2-(2'-hydroxy-3',5'-bisphthalamidomethylphenyl)benzothiazole;

2-(2'-hydroxyphenyl-3',5'-bisphthalimidomethyl) benzothiazole;

2-(2'-hydroxyphenyl-3'-phthalimidomethyl) benzothiazole;

2-(2'-hydroxyphenyl-5'-phthalimidomethyl) benzothiazole;

4-(4'-dimethylaminobenzylidene)-2-phenyloxazolin-5-one;

2-anilide-2',5'-dichlorobenzoylamino-1,9-anthapyrimidone;

bis-2,5-(benzoxazoyl)hydroquinone;

bis-2,5-(benzimidazoyl)hydroquinone;

bis-2,5-(benzothiazoyl)hydroquinone;

5-(4-(dimethylamino)benzylidene)barbituric acid;

Sodium 3-(2-benzothiazolyl)-4-hydroxybenzenesulfonate;

Zinc sulfide doped with copper;

Zinc sulfide doped with manganese;

Zinc sulfide and cadmium sulfide doped with copper;

Zinc sulfide and cadmium sulfide doped with silver;

Sodium heteropolytungstate polyhydrate doped with europium;

Zinc sulfide doped with calcium, cadmium, magnesium, molybdenum, and silicon;

Cadmium sulfide doped with aluminum, calcium, magnesium, silicon, and zinc;

Zinc selenide doped with aluminum, cadmium, and silicon;

Cadmium selenide doped with aluminum, magnesium, silicon, and zinc;

Calcium sulfide and strontium sulfide doped with heavy metals; and mixtures thereof.

These fluorescent and phosphorescent compounds can be applied to a variety of fibrous, hard and resilient substrates, and can be easily removed. The fluorescent or phosphorescent pigment dispersion phase is included in the guidepath composition of the present invention in an amount of 0.1 to 20 percent by weight of the coating composition (wet basis). For best results, the fluorescent or phosphorescent dispersion phase includes a blend of one or more fluorescent or phosphorescent pigments, at least one emulsifying agent capable of effectively dispersing the fluorescent or phosphorescent pigment in the aqueous phase of the dispersion, a thickening agent for aiding in the long term suspension of the pigment(s), such as gums, clays or emulsion resins, and sufficient water (e.g., 25% to 80% by weight) to provide a dispersion having a fluorescent or phosphorescent pigment content of 5 to 75% by weight of the wet dispersion. In the dry coating composition the fluorescent or phosphorescent compound comprises about 0.5% to about 25% based on the weight of solids in the guidepath as dryed and cured. The particular emulsifying agent and thickening agent, e.g., emulsion resin, can vary depending upon the fluorescent pigment utilized, however, examples of the emulsifying agent include glycols, polyols, or nonionic surfactants and examples of emulsion resins include polyacrylates, polyacrylic acids or polyacrylamides. The fluorescent or phosphorescent pigment dispersion phase also may include other optional components, including, but not limited to, defoamers, sequestering agents, preservatives and the like. The fluorescent pigment dispersion phase is made independent of, and then combined with the polymer binder phase to produce the fluorescent guidepath coating compositions.

In operation, the present invention, when used in a hospital setting, relates to a four-step automated system for the preparation and transportation, through use of an AGV, of pharmaceutical or other products to any of a variety of predetermined locations, such as nurses' stations, or in reverse, to a central laboratory. As an alternative, the invention could be made to deliver products directly to the patient's room.

The system comprises an input queue, a dispensing apparatus comprising a robot device and a plurality of stations from which the robot device works, an inspection station, and a loading station which places the product onto the AGV. A computer interface provides bi-directional communication between analytical instruments, robots, and peripheral devices and a computer. The robot employed by the system is responsive to computer commands and capable of performing mechanical functions including selection and retrieval of the necessary item (i.e., drug vial, syringe, etc.) and manipulation of retrieved items such that the desired product is prepared.

The system described will receive its instructions from an interface established between a Parenteral Products Automation System ("PPAS"), as described in co-pending Ser. No. 08/513,569, and the Pharmacy Information System present at the facility where the invention is in place. These instructions are communicated to the processing station comprising a robotic device and a plurality of work stations. The robotic device, utilizing weigh stations for quality control, retrieves a drug dosage vial, reconstitutes the powdered drug dosage of the drug, agitates it to effect a complete dissolving of the product in the added diluent, affixes a syringe tipcap to the diluted product, and labels the final prepared product. The product is transported via a conveyor belt to an inspection station where all of the products are inspected to assure an accurately prepared product. Possible inspection method include manual inspection, gas chromatography, specific gravity testing, and/or barcode scanning. From the inspection station, via conveyor belt, the product enters a staging area for loading onto an AGV which determines the appropriate station to send the product based upon information provided on the label affixed to the syringe. When the carrier is removed from the receiving station the production cycle is ended.

The PPAS control system database is capable of being searched to determine the status of any single parenteral product being prepared. The overall throughput of the system should be approximately 50 units per hour, with no more than 1 hour of downtime required per day for maintenance, supply replenishment, cleaning, etc.

Step one involves the inputs to the PPAS from the transfer of a file which is prepared within the Pharmacy Information System used in the facility being automated. Based on the patient information in the Pharmacy Information System, a computer automatically sends requests to the PPAS for the preparation and delivery of the proper parenteral product to the appropriate location at the time it is to be administered to the patient. These files are commonly used within the Pharmacy Information System to batch production requirements into a grouping of parenteral products required for a precise period of time. This time period can usually be defined by the facility and can be varied to meet its needs. The contents of this file might include the following database elements which may be used by PPAS:

1. Name, strength, and diluent of drug;
2. Name of patient for whom the product is intended;
3. Room number location of patient;
4. Label instructions and notes; and
5. Time the product is due for administration.

Barcodes could be used to provide any of the above mentioned information upon scanning, thus, enabling the control system database to be searched to determine the status of any product at any time during its preparation and transportation. Further, the system could allow for manual requests, input at any of a plurality of computer terminals within the hospital.

Step two of the invention comprises the product preparation which involves a series of manipulations performed by the robotics arm or arms resulting in the preparation of a single intravenous product unit based on the information provided in step one. The robotics arm or arms should be situated such that it can access any of the plurality of stations from which it performs the product preparation. The series of manipulations are as follows:

The drug specified is retrieved by a robotics arm from a gravity feed rack which was hand-fed prior to the initiation of the automated preparation. A sensor should be placed at the end of each column of drug storage to detect an empty rack and thus notify the operation system that the column needs to be replenished. As an alternative, inventory control software could manage the number of units present in the supply rack or column.

Upon retrieval of the correct drug vial by the robotics arm, the protective cap is removed by inserting the vial into a jig and snapping off the protective cap. The exposed rubber stopper of the vial is swabbed on an alcohol impregnated cotton pledget station. The pledget remains moist with isopropyl alcohol due to a wicking action. Prior to start up of the system, the alcohol container must be filled.

After cleaning the stopper with alcohol, the robotics arm is to set the vial down and retrieve from a syringe rack a standard syringe with a needle attached. The arm then removes the protective needle cover by sticking the cap in a jig and pulling straight up. This action exposes the needle, and the protective cap is discarded.

Next the robotics arm moves to another station and inserts the needle into the injection port of a bag of Sterile Water for Injection which is held inverted, and must be changed with every 100 units prepared. The system must notify the operator to change this unit at the appropriate time. For example, inventory control software could keep track of the units prepared. After insertion of the needle, the plunger on the syringe is extracted drawing water into the syringe.

The syringe and needle containing the water is extracted from the Sterile Water for Injection bag. The regular needle is discarded in a Sharps Waste Container at another station and a vented needle is retrieved from a rack and placed on the end of the syringe. The robotics arm returns to the drug vial where it inserts the syringe into the selected vial of drug. The plunger of the syringe is depressed, expelling the Sterile Water for Injection into the drug vial. Once completely emptied, the syringe and vented needle are removed, and the vial and diluent are placed on an agitation table for 60 seconds.

At this point the system should be able to start on the next drug while waiting for the current drug to complete the agitation step. This is important to maintain the productivity of the unit at a high level of output. Also, the agitation table can be divided into four zones, with each zone being designated within the operating system.

Upon completion of agitation, the robotics arm removes the drug vial from its zone of the agitation table and places it upon a compounding counter. The arm then retrieves the appropriate syringe with vented needle, and inserts the needle into the vial of the drug in solution. The complete, attached system of drug vial, syringe and needle is inverted with the syringe pointing upward. The plunger is retracted, thereby withdrawing the entire contents of the drug vial back into the syringe. The syringe and vented needle are removed from the empty drug vial, and the empty vial is placed in a transport bin, which is gravity fed to a staging location adjacent to a conveyor belt.

The robotics arm removes the vented needle from the syringe. This needle is placed in a Sharps Waste Container. The syringe is inverted and a syringe tip cap is placed on its end. The reconstituted drug within the syringe is then labeled by rolling it over the labeling unit.

The syringe containing the reconstituted and labeled drug is then weighed to assure that the unit meets anticipated specifications for weight, assuring that all diluent was added and all of the drug extracted into the syringe. If accepted, the drug is placed in the same transport bin as the empty drug vial, and the transport bin is slid onto the conveyor belt which transporting the product to the inspection station.

In use of the dispenser, (e.g. for obtaining a dose of Technetium 99 m), syringes, needles, needle caps, vials, etc. are stored on racks with sensors to detect empty racks.

If dose dilution is required, saline solution may be withdrawn from an appropriate vial by use of the syringe, and then inserted into a required vial.

It will be understood that if desired the assembly may be modified to accept two, or more syringes, and may be operated in an alternative manner from that described above.

Step three represents the manual or automatic inspection procedure incorporated into this invention. It sits midway between the preparation station and the transportation station. The resultant drug product will be visually inspected for particular matter, proper labeling, and matching of the drug vial to the stated contents on the label of the syringe. If all is correct, the product will be initialed by the inspecting pharmacist, and placed back on the conveyor for transportation to the transportation system. The transport bin will be returned to the rack feeding the robotics arm, and the empty drug vial will be discarded.

For a preferable automated inspection procedure, a few alternatives are available: barcode scanning; specific gravity reading; and gas chromatography. Barcode scanning represents an automated method not unlike the manual inspection (i.e., reading and comparing the labels of the vial and product). Reading the specific gravity of the product allows the system to determine the constitution of the product, with which the system can determine whether it is correct or incorrect. Gas chromatography produces similar results as the specific gravity reading through detecting the prior contents of the empty vial and detecting the constitution of the syringe product.

Step four of the present invention relates to transportation to a remote location or locations via AGV thereby providing a completely automated pharmaceutical preparation and delivery system within a hospital.

Figure 1:
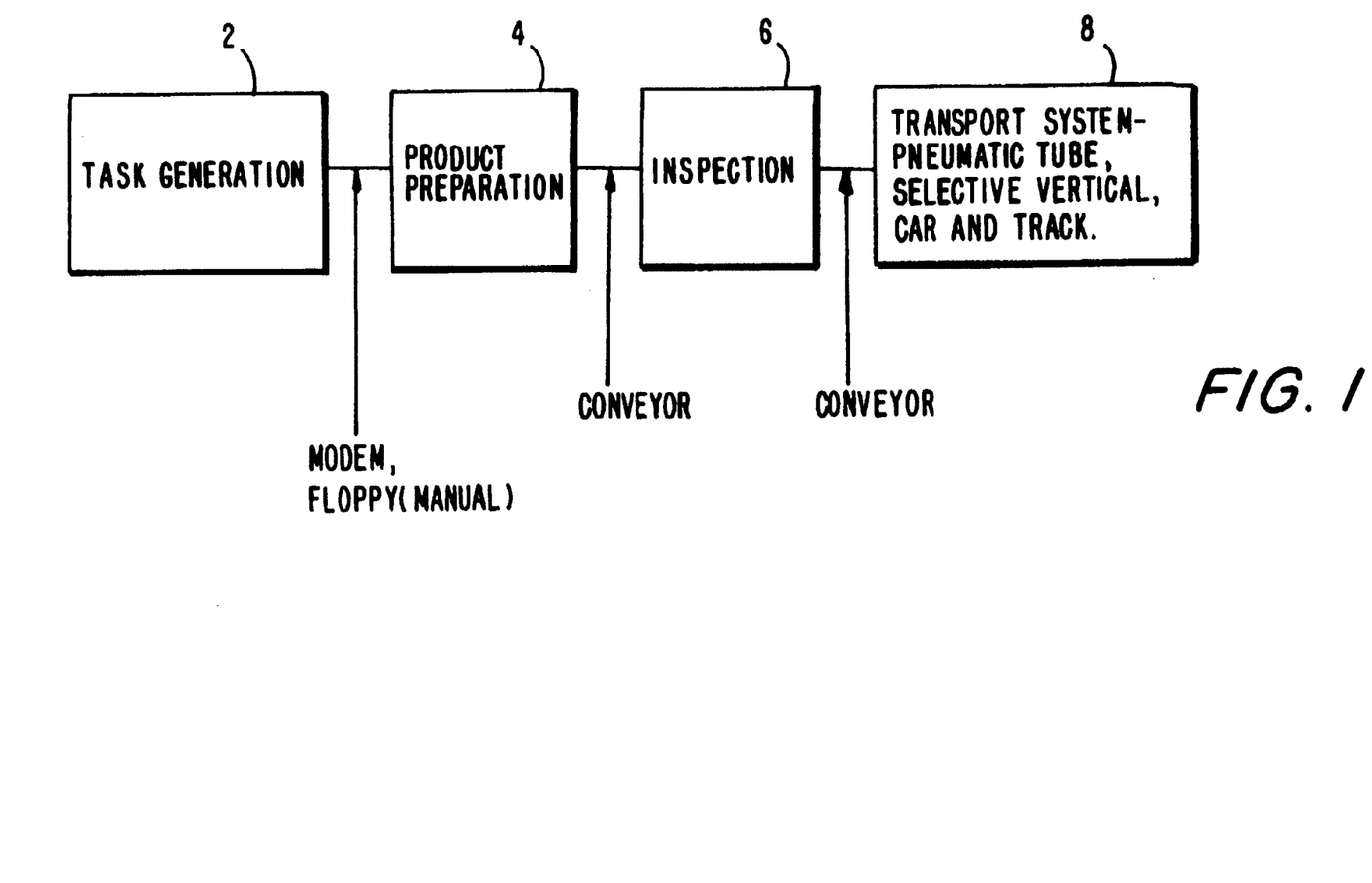
FIG. 1 shows functional block diagram of the entire invention.

Referring now to FIG. 1, an overview of the entire present invention is demonstrated in a functional block diagram. It shows input queue step 2 (or task generation step), product preparation step 4, inspection step 6, and transportation step 8.

Figure 2:
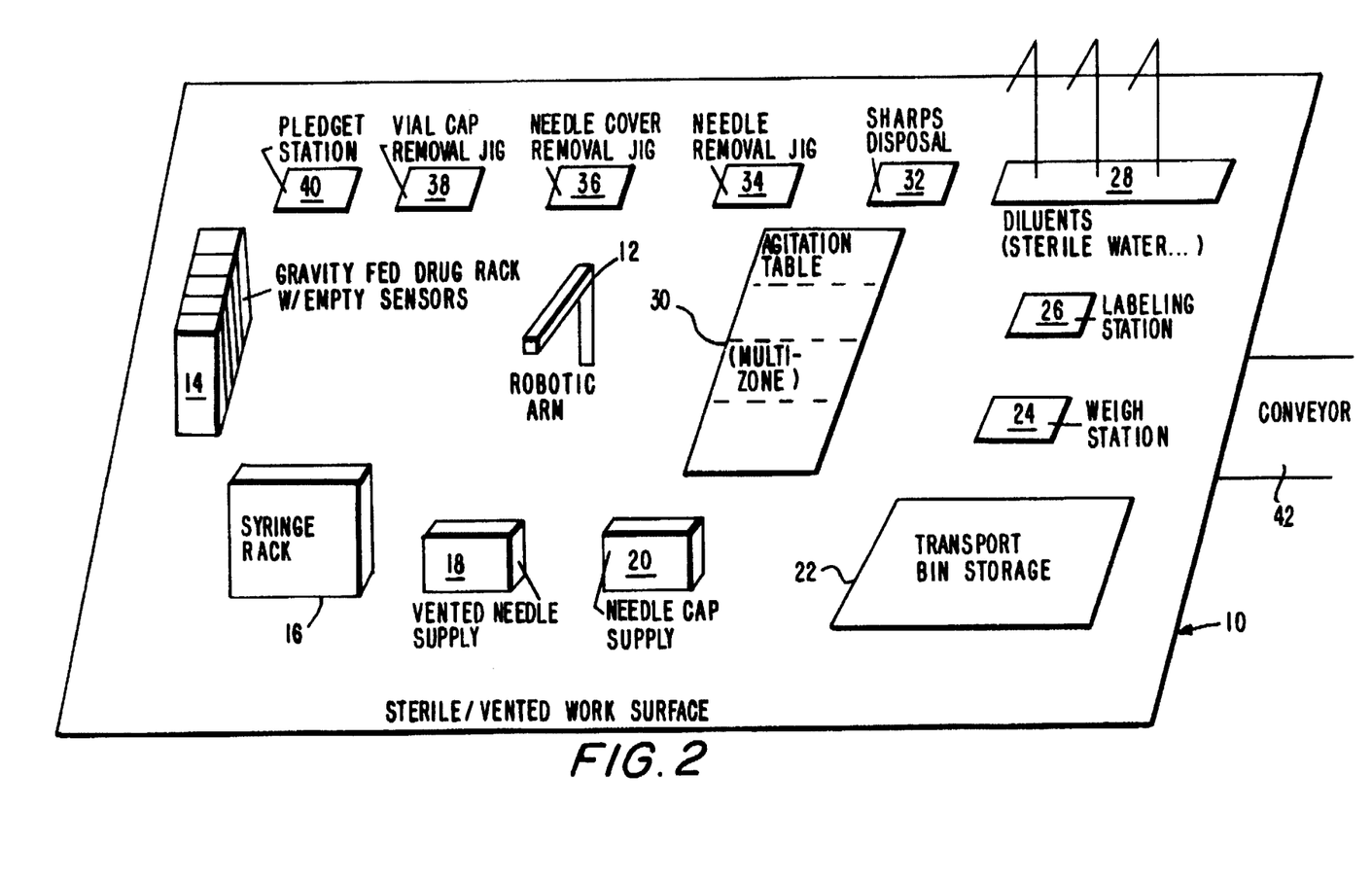
FIG. 2 shows a perspective diagrammatic representation of a dispensing apparatus.

Referring now to FIG. 2, the product preparation step is shown, and comprises a base 10 having thereon an industrial robot 12 which performs a series of manipulations resulting in the preparation of a single intravenous product unit based upon the information provided by the Pharmacy Information System. The robot 12 may have articulated arms, and gripping means in the form of jaw members having respective depending tangs at a rotatable wrist element of the arm.

Robot 12 may be arranged to present the jaw members at a number of stations including: gravity fed drug rack 14, syringe rack 16, needle supply rack 18, pledget station 40, vial cap removal jig 38, needle cover removal jig 36, needle removal jig 34, diluents rack 28, multi-zone agitation table 30, labeling station 26, weigh station 24, waste outlet 32, and transport bin storage 22.

The drug specified is retrieved by robotics arm 12 from gravity feed rack 14. A sensor located at the end of each column of the drug storage rack will detect an empty rack and notify the operation system that the column needs to be replenished.

Upon retrieval of the correct drug vial by the robotics arm 12, the protective cap is removed, and the exposed rubber stopper of the vial is swabbed on an alcohol impregnated cotton pledget station 40. The pledget remains moist with isopropyl alcohol due to a wicking action.

After cleaning the stopper with alcohol, robot 12 sets the vial down, retrieves a standard 20cc syringe with needle attached from syringe rack 16, and removes the protective needle cover by inserting it in needle cover removal jig 36 and pulling straight up. This action exposes the needle, and the protective cap is discarded.

Next, robot 12 inserts the needle into the injection port of a bag of Sterile Water for Injection from diluents rack 28. After insertion of the needle, the plunger on the syringe is extracted to the 20cc mark, drawing in 20cc of water into the syringe.

The syringe and needle containing the 20cc is extracted from the Sterile Water for Injection bag on diluents rack 28. The regular needle is discarded in Sharps Waste Container 32 and a vented needle is retrieved from vented needle rack 18 and placed on the end of the syringe. The syringe is inverted and inserted into the selected vial of drug. The plunger is depressed, expelling the 20cc of Sterile Water for Injection into the drug vial. The syringe and vented needle are removed, and the vial containing the diluent and drug are placed on agitation table 30 for sixty seconds.

Robot 12 proceeds to start on the next product while waiting for the current drug to complete the agitation step. Agitation table 30 is divided into zones relating to the zones in the pneumatic tube system.

Upon completion of agitation, the drug is removed from its zone of agitation table 30 and placed upon a compounding counter. The robot 12 then retrieves the appropriate syringe from syringe rack 16 and vented needle from vented needle rack 18, inserts vented needle into syringe, and inserts the syringe with needle into the vial of the drug in solution. The complete, attached system of drug vial, syringe and needle is inverted, with the drug uppermost and the syringe pointed upward. The plunger is retracted, withdrawing the entire contents of the drug vial back into the syringe. The syringe and vented needle are removed from the empty drug vial, and the empty vial is placed in a transport bin retrieved from transport bin storage 22, which is then fed to a staging location adjacent to conveyor 42.

The vented needle is removed from the syringe while in an upright position. This needle is placed in Sharps Waste Container 32. The syringe is inverted and a syringe tip cap is placed on the end of the syringe. The syringe with the reconstituted drug is labeled by rolling it over labeling station 26.

The labeled syringe with the reconstituted drug is placed on weigh station 24 and weighed to assure that the prepared unit meets anticipated specifications for weight, assuring that all diluent was added, and all drug extracted into the syringe. If accepted, the drug is placed in the same transport bin as the empty drug vial, and the transport bin is slid onto conveyor 42 which transports the product to the inspection station.

Figure 3:
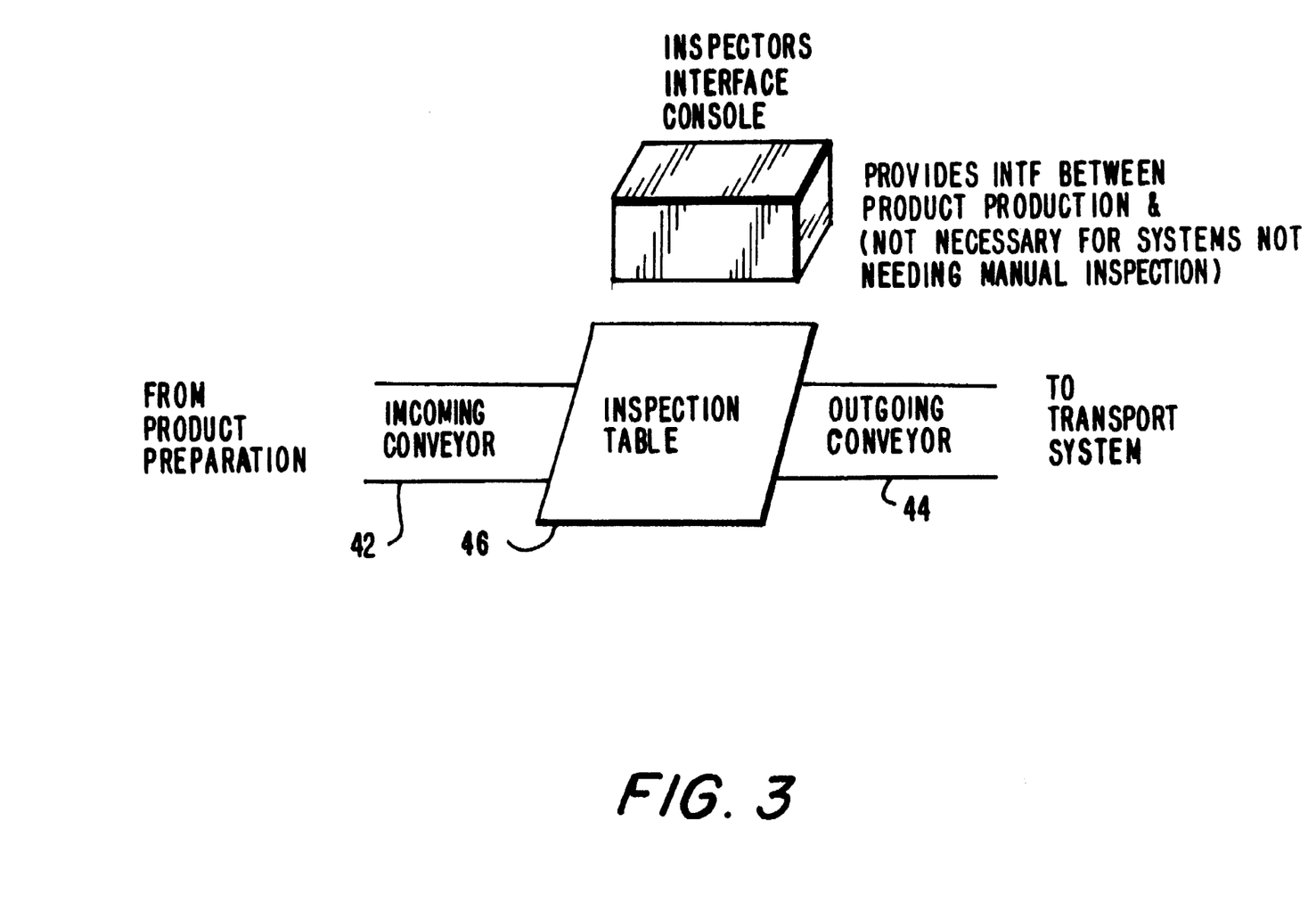
FIG. 3 shows a perspective diagram of the inspection station.

FIG. 3 represents the inspection station, either manual (i.e., by a highly skilled person) or automatically (i.e., barcode scanning, gas chromatography, and/or specific gravity measuring). FIG. 3 shows incoming conveyor 42, inspection table 46, and outgoing conveyor 44. The product enters the inspection station via conveyor 42, wherein product is stopped on inspection table 46 to be either manually or automatically inspected. If approved, the product is placed in a transport bin which is placed on conveyor 44 leading to the "ROBOTOTUBE" AGV.

Figure 4A:
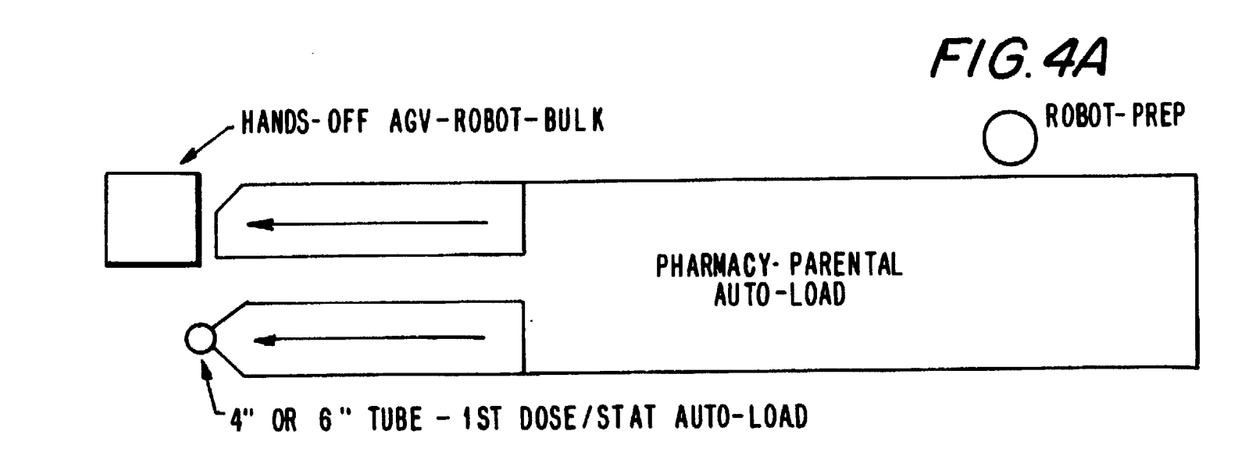
FIG. 4A shows a plan view of a PPAS in contact with, alternatively, an AGV or a pneumatic tube delivery system.
Figure 4B:
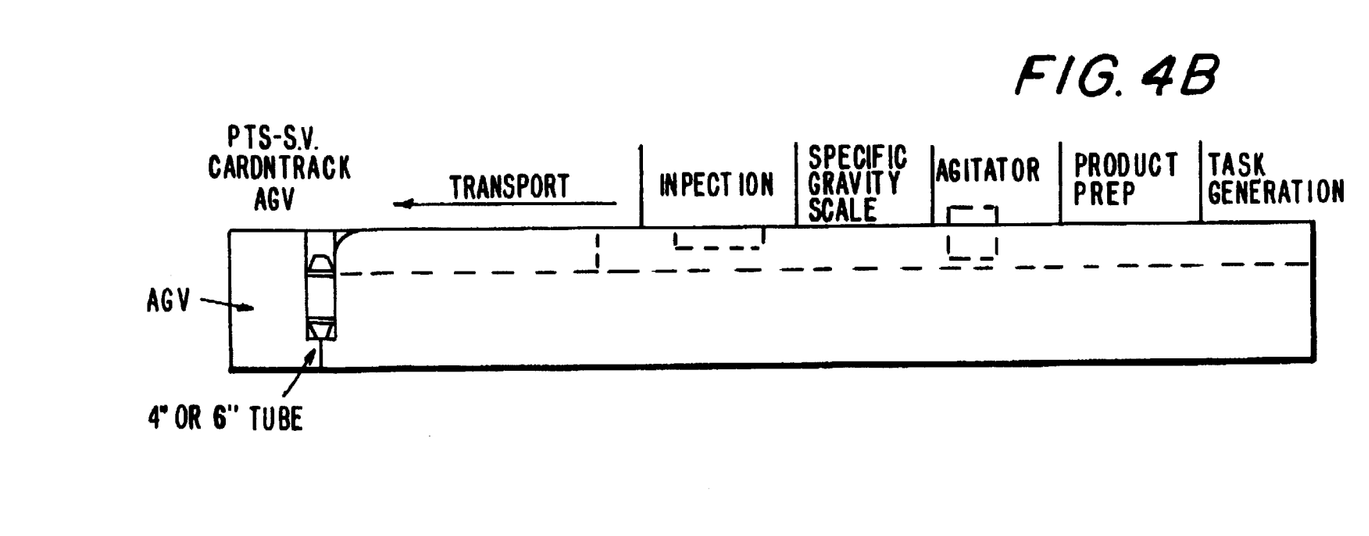
FIG. 4B shows an elevated view of the system of FIG. 4A.

FIGS. 4A and 4B depict plan and elevational views of the fully automated delivery system of the present invention.

Figure 5:
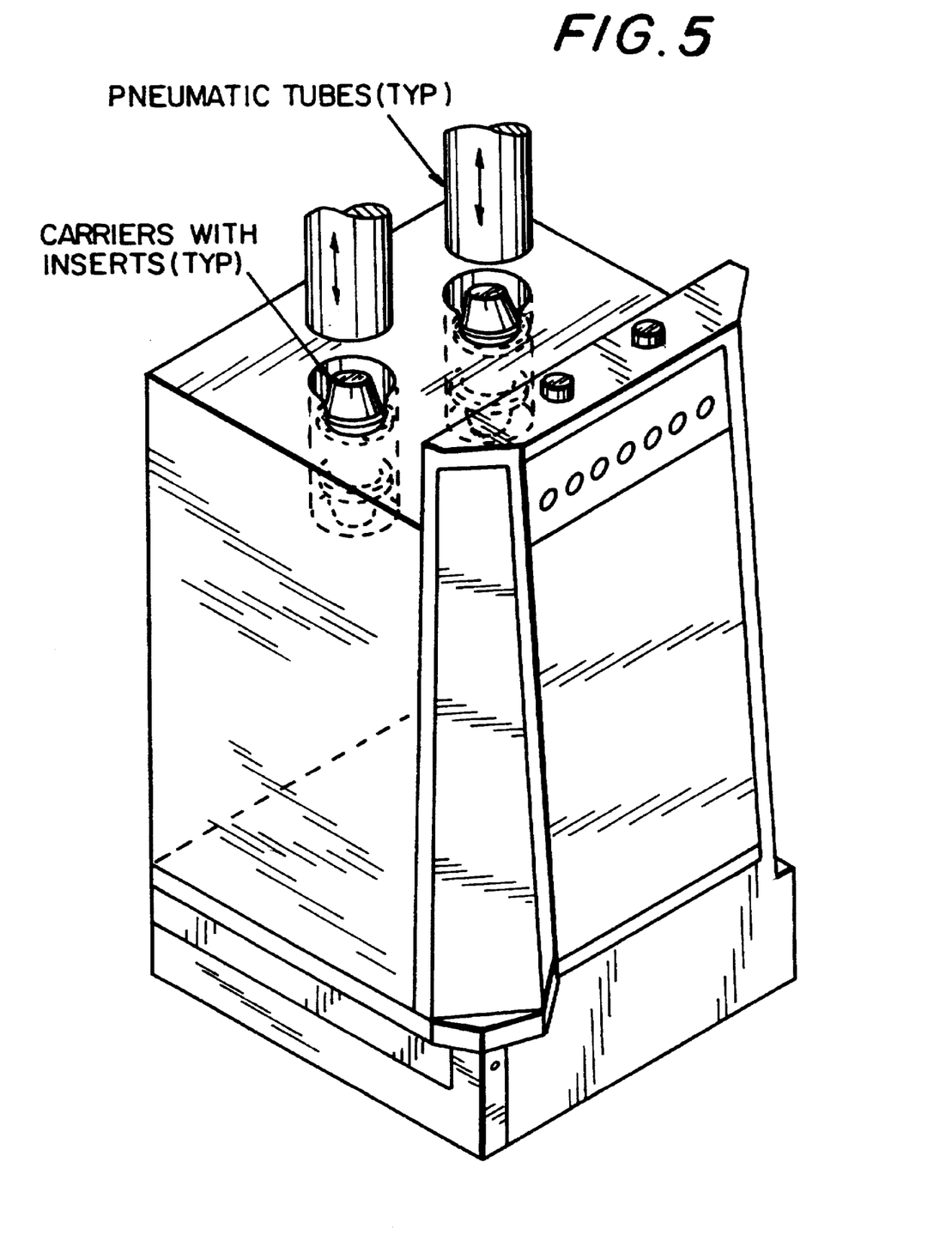
FIG. 5 shows a "ROBOTOTUBE" AGV.

FIG. 5 shows a "ROBOTOTUBE" AGV having various receptacles for receiving materials to be transported from one location to another in accordance with the invention.

It will be appreciated that although the above description is limited to a system for use in a hospital pharmacy, the invention is applicable for other similar purposes. For instance, the invention may be used with dietaries, laboratories, central supply areas, etc. While the foregoing embodiments of the invention have been set forth in considerable detail for the purposes of making a complete disclosure of the invention, it will be apparent to those skilled in the art that numerous changes may be made in such details without departing from the spirit and the principles of the invention.

I claim:

1. A system for automatically transporting products by combining a pneumatic tube carrier system and an automated guidance vehicle, said system comprising:

at least one computer having a database capable of receiving information, transmitting said information within said system, and maintaining control within said system;

a delivery means for transporting a product from a storage location to a pneumatic tube carrier;

a first loading means for automatically inserting product into said carrier;

a second loading means for automatically inserting said carrier into said pneumatic tube system;

a third loading means for automatically inserting said carrier into said automated guidance vehicle;

a control means for coordinating transportation of said carrier through said pneumatic tube system to said automated guidance vehicle, and for controlling the movement of said automated guidance vehicle to appropriate locations.

2. A system as claimed in claim 1 wherein a visual inspection station is located midway between said robot and said automated guidance vehicle.

3. A system as claimed in claim 2 in which the inspection station comprises barcode scanning.

4. A system for automatically transporting products by combining a pneumatic tube carrier system, a computerized robotics device, and an automated guidance vehicle, said system comprising:

at least one computer having a database capable of receiving information and transmitting said information within said system, maintaining control within said system;

at least one robot, said robot having:
at least one movable arm;
at least one pair of gripping means wherein said gripping means are attached to at least one of said movable arms having sensors wherein said sensors indicate the presence or absence of an object;

a delivery means for transporting a product from a storage location to a pneumatic tube carrier;

a first loading station comprising means for loading said product into said carrier;

a second loading station comprising means for loading said carrier onto said automated guidance vehicle; and a control means for coordinating transportation of said automated guidance vehicle to appropriate locations.

5. A system as claimed in claim 4 wherein a visual inspection station is located midway between said robot and said automated guidance vehicle.

6. A device as claimed in claim 5 in which the inspection station comprises barcode scanning.

7. A system for automatically delivering products from a storage location to a predetermined location, said system comprising:

at least one computer;

at least one robot device;

at least one automated guidance vehicle; and a transporter for moving said products between said robot and said automated guidance vehicle;

wherein said automated guidance vehicles may be moved in accordance with signals generated from said computer.

8. A system as claimed in claim 7 wherein a visual inspection station is located midway between said robot and said automated guidance vehicle.

9. A system as claimed in claim 8 in which the inspection station comprises barcode scanning.

10. A system as claimed in claim 1 wherein said transporter is a pneumatic tube carrier system.

* * * * *